United States Patent
Li et al.

(10) Patent No.: US 11,997,205 B2
(45) Date of Patent: May 28, 2024

(54) CREDENTIAL VERIFICATION AND ISSUANCE THROUGH CREDENTIAL SERVICE PROVIDERS

(71) Applicant: TBCASOFT, INC., Sunnyvale, CA (US)

(72) Inventors: Chiahsin Li, Sunnyvale, CA (US); Ling Wu, Sunnyvale, CA (US)

(73) Assignee: TBCASOFT, INC., Sunnyvale, CA (US)

( * ) Notice: Subject to any disclaimer, the term of this patent is extended or adjusted under 35 U.S.C. 154(b) by 0 days.

(21) Appl. No.: 16/801,114

(22) Filed: Feb. 25, 2020

(65) Prior Publication Data

US 2020/0274713 A1     Aug. 27, 2020

Related U.S. Application Data

(60) Provisional application No. 62/809,750, filed on Feb. 25, 2019.

(51) Int. Cl.
*H04L 29/06* (2006.01)
*G06F 16/27* (2019.01)
(Continued)

(52) U.S. Cl.
CPC ............ *H04L 9/3213* (2013.01); *G06F 16/27* (2019.01); *G06Q 30/018* (2013.01);
(Continued)

(58) Field of Classification Search
None
See application file for complete search history.

(56) References Cited

U.S. PATENT DOCUMENTS 9,397,838 B1 *  7/2016  Chen .................. H04W 12/06
9,397,980 B1 *  7/2016  Chen ...................... G06F 21/33
(Continued)

FOREIGN PATENT DOCUMENTS

WO    2018007828 A2    1/2018
WO    2018170341 A1    9/2018

OTHER PUBLICATIONS

International Search Report and Written Opinion dated May 22, 2020 in a counterpart PCT International Patent Application No. PCT/US2020/020001, filed on Feb. 26, 2020.
(Continued)

*Primary Examiner* — Shin-Hon (Eric) Chen
*Assistant Examiner* — Hassan A Hussein
(74) *Attorney, Agent, or Firm* — Huan-Yi Lin (57) ABSTRACT

A method for verifying and issuing credential, includes providing, by a first credential management system of a first credential service provider, a sharing credential token and a service endpoint to a requesting device of the credential owner, upon a request; receiving, by a second credential management system of a second credential service provider, from a verifying device of a verifier through the requesting device, the sharing credential token and the service endpoint; sending, by the second credential management system, a proof request to the first credential management system based on the service endpoint; generating, by the first credential management system, a proof based on the proof request; and verifying, by the second credential management system, the proof based on credential cryptography information retrieved from a distributed ledger. The method implemented on a distributed platform across different service providers and distributed ledgers ensures trustworthy credential verification and issuance.

18 Claims, 5 Drawing Sheets

(51) Int. Cl.
*G06Q 30/018* (2023.01)
*H04L 9/32* (2006.01)
*H04L 9/40* (2022.01)
*H04W 12/06* (2021.01)
*H04L 9/00* (2022.01)
*H04W 8/18* (2009.01)

(52) U.S. Cl.
CPC .......... *H04L 9/3221* (2013.01); *H04L 9/3297* (2013.01); *H04L 63/123* (2013.01); *H04W 12/068* (2021.01); *G06Q 2220/00* (2013.01); *H04L 9/50* (2022.05); *H04W 8/18* (2013.01)

(56) References Cited

U.S. PATENT DOCUMENTS

| | | | | |
|---|---|---|---|---|
| 9,516,018 | B1* | 12/2016 | Vazquez | G06F 21/34 |
| 9,668,136 | B2* | 5/2017 | Mistry | H04W 12/068 |
| 10,356,087 | B1* | 7/2019 | Vetter | G06F 21/36 |
| 10,862,883 | B1* | 12/2020 | Bhattacharyya | H04L 63/0807 |
| 10,929,842 | B1* | 2/2021 | Arvanaghi | H04L 9/3239 |
| 2012/0233334 | A1* | 9/2012 | Braudes | H04L 65/80 709/227 |
| 2013/0219479 | A1* | 8/2013 | DeSoto | G06Q 20/4014 726/6 |
| 2014/0020073 | A1* | 1/2014 | Ronda | H04L 63/0853 726/7 |
| 2014/0245412 | A1* | 8/2014 | Seidl | H04L 9/321 713/168 |
| 2015/0324791 | A1* | 11/2015 | Khan | H04W 12/086 705/44 |
| 2017/0034142 | A1* | 2/2017 | Camenisch | H04L 9/3268 |
| 2017/0094509 | A1* | 3/2017 | Mistry | H04W 4/50 |
| 2017/0171175 | A1* | 6/2017 | Ylonen | H04L 63/101 |
| 2017/0201850 | A1* | 7/2017 | Raleigh | H04W 4/50 |
| 2017/0213212 | A1* | 7/2017 | Dicker | G06Q 20/10 |
| 2017/0222814 | A1* | 8/2017 | Oberhauser | G06F 21/33 |
| 2017/0359184 | A1* | 12/2017 | Camenisch | H04L 63/0823 |
| 2018/0288617 | A1* | 10/2018 | Robison | H04L 63/08 |
| 2018/0322489 | A1* | 11/2018 | Altenhofen | H04L 9/3297 |
| 2019/0005470 | A1* | 1/2019 | Uhr | H04L 9/3239 |
| 2019/0188711 | A1* | 6/2019 | Wu | G06Q 20/065 |
| 2019/0228407 | A1* | 7/2019 | Wu | H04L 9/0637 |
| 2019/0363886 | A1* | 11/2019 | Atwood | H04L 63/0807 |
| 2019/0372962 | A1* | 12/2019 | Maria | G06F 21/41 |
| 2020/0111082 | A1* | 4/2020 | Wu | G06Q 20/3674 |
| 2020/0134586 | A1* | 4/2020 | Wu | H04L 9/0825 |
| 2020/0169415 | A1* | 5/2020 | Schmidt | H04L 9/3247 |
| 2020/0186561 | A1* | 6/2020 | Narayanan | H04W 12/068 |
| 2020/0187004 | A1* | 6/2020 | Reimer | H04L 63/0815 |
| 2020/0210997 | A1* | 7/2020 | Sarin | G06Q 20/223 |
| 2020/0294046 | A1* | 9/2020 | Wu | G06Q 20/36 |
| 2020/0374129 | A1* | 11/2020 | Dilles | H04L 9/3273 |
| 2021/0049560 | A1* | 2/2021 | Kulpati | G06F 16/2379 |
| 2021/0150498 | A1* | 5/2021 | Fukuizumi | H04M 15/50 |
| 2021/0184852 | A1* | 6/2021 | Feinberg | H04L 67/10 |
| 2021/0203488 | A1* | 7/2021 | Ståhl | H04L 9/0631 |
| 2021/0281428 | A1* | 9/2021 | Kempf | G06F 21/64 |
| 2021/0351929 | A1* | 11/2021 | Palanisamy | G06K 7/1417 |
| 2021/0358032 | A1* | 11/2021 | Cella | G06F 16/2379 |

OTHER PUBLICATIONS

Office Action of European counterpart application No. 20762690.4 dated Sep. 6, 2022.

* cited by examiner

FIG. 1

| | |
|---|---|
| 210 | the requesting device 110 sends a request to the first credential management system 120 of the first credential service provider |
| 220 | the first credential management system generates a sharing credential token and a service end-point |
| 222 | both the sharing credential token and the service end-point (or QR code) is sent back to the requesting device 110 of the credential owner |
| 224 | both the sharing credential token and the service end-point (or QR code) can be provided by the requesting device 110 of the credential owner to the verifying device 140 of the verifier |
| 226 | both the sharing credential token and the service end-point (or QR code) is provided to the second credential management system 150 of the second credential service provider |
| 230 | the second credential management system 150 sends the proof request to the first credential management system 120 |
| 240 | the first credential management system determines whether the sharing credential token is valid |
| 242 | the first credential management system then selects one or more attributes respectively from one or more acceptable credentials based on the VRD |
| 244 | the first credential management system generates a revealed attribute or a predicate attribute for each required attribute to generate the proof |
| 246 | the first credential management system sends the proof to the second credential management system |
| 250 | the second credential management system requests the second node 160 of the distributed identity blockchain to retrieve credential cryptography information |
| 255 | the second node 160 provides the above credential cryptography information back to the second credential management system 150 |
| 260 | the second credential management system 150 verifies the proof based on the above credential cryptography information retrieved from the distributed ledger |

FIG. 2

Verification Requesting Documents

| 510 | the second credential management system generates a credential offer for issuer |

| 520 | the second credential management system 150 sends the credential offer to the first credential management system 120 |

| 530 | the first credential management system 120 generates the credential request |

| 540 | the first credential management system 120 sends the credential request back to the second credential management system 150 |

| 550 | the second credential management system generates the new credential |

| 560 | the second credential management system 150 sends the new credential to the first credential management system 120 |

| 570 | the first credential management system 120 stores the new credential for the credential owner. |

FIG. 5

CREDENTIAL VERIFICATION AND ISSUANCE THROUGH CREDENTIAL SERVICE PROVIDERS

BACKGROUND OF THE INVENTION

1. Field of the Invention

The present invention relates to credential verification and/or issuance and, more particularly, to the credential verification and/or issuance through one or more credential service providers.

2. Description of the Related Art

Upon a credential verification or issuance occasion, the credential owner should present at least one conventional credential that takes one of the forms, for example, a piece of paper, a plastic card, a magnetic stripe card, a chip card or the like, to a person for the person (a verifier/issuer) or his/her device/mechanism to verify if the credential is a genuine one and contains information required for the verification or issuance. From the perspective of credential owners, besides the physical forms resulting in unsatisfactory portability and prone to being lost and stolen, conventional credentials also have the following drawbacks which are evidential from the examples below.

First, given national ID card as one example, conventionally a paper/plastic ID card or in a more advanced situation, a smart ID card (chip card or IC card), may be adopted for implementation of verifying national ID. In either situation, the technical threshold essentially requires a centralized national ID database which stores civilian information of a nation and is usually built over decades with older database technologies. Thus, for verification, when the verifier, such as a policeman, asks for verification of the identity of a civilian, the civilian who owns a national ID card may present the ID card to the policeman. Upon receiving the ID card, the policeman may check the photo on the card, and then calls the police station to verify the ID number, name, address, etc. with the centralized database accessible from the police station. In a more advanced scenario, the policeman may have a mobile device that can directly query the database (in the smart card situation, after authentication of the card) on the road to save time. Such approach has the disadvantages that such verification infrastructure is very expensive to build/maintain, the database is usually not available to the general public because of privacy data protection concerns, the verifier has to contact the centralized server to verify the ID, and when the centralized site is down, the verifications stop.

Second, taking company/building access badge as another example, conventionally the verification can be implemented by issuing QR code in advance and registering later at the reception desk. In such case, before the visitor visits a company, a company employee sends the invite link to the visitor for the visitor to register the invitation in the company system, print the QR code from the link, and then visit the building that he/she was invited to. Upon arrival, the receptionist scans the QR code and checks with the company registration database. If the QR code is valid, the visitor is allowed to access the building. Such approach has the disadvantages that the link email can be stolen and the QR code can be printed by an unauthorized person for accessing the building, and the printed QR code may also be stolen or someone may take a picture of the QR code and access the building, rendering this approach insecure and easily compromised by the man-in-the-middle attack. Alternatively, without any prior registration, a visitor goes to the reception desk directly and present his/her ID. The visitor or receptionist may enter the information of the ID at a console. The receptionist then verifies the visitor's ID and the information and gives him/her a badge. Such approach has the disadvantages of being more inefficient and requiring the visitor to register at the reception desk upon arrival. In addition, the ID used in the verification process can be forged, it is hard to check the authenticity of the ID.

To cope with the foregoing drawbacks arising from the conventional credentials used for verification and issuance, digital credentials appear to be one of the solutions and a future trend. This disclosure describes how to deliver credential services for digital credentials in a more trustworthy and secure manner. As a result, this disclosure describes a distributed system infrastructure and credential services across different credential service providers, for example, various telecom carriers around the world, ensuring that credential management services do not solely relied on centralized credential service providers.

SUMMARY OF THE INVENTION

The present disclosure is directed to one or more methods, systems, apparatuses, and computer readable mediums storing processor-executable process steps for verifying a requested credential of a credential owner and/or issuing a new credential through one or more credential service providers. The method comprises (a) providing, by a first credential management system of a first credential service provider, a sharing credential token and a service endpoint to a requesting device of the credential owner, upon a request; (b) receiving, by a second credential management system of a second credential service provider, from a verifying device of a verifier through the requesting device, the sharing credential token and the service endpoint; (c) sending, by the second credential management system of the second credential service provider, a proof request to the first credential management system of the first credential service provider based on the service endpoint; (d) generating, by the first credential management system of the first credential service provider, a proof based on the proof request; and (e) verifying, by the second credential management system of the second credential service provider, the proof based on credential cryptography information retrieved from a distributed ledger. In one embodiment, the credential owner subscribes the service of the first credential management system from the first credential service provider while the verifier subscribes the service of the second credential management system from the second credential service provider. The first credential management system of the first credential service provider may be the same or different from the second credential management system of the second credential service provider.

Compared to conventional credential services, one advantage of this disclosure is to provide real-time verifications via a distributed ledger. Conventionally, a verifier has to contact the credential issuer to verify whether such credential is a genuine one, which can take a long time to accomplish. In addition, a verifier has to contact various different credential issuer depending on the type of the credential. Each credential issuer may have very different procedures or requirements to be complied with for obtaining verification.

Compared to other digital credential services where credentials are stored at a mobile device of the credential owner, one advantage of this disclosure is that the credential owner would not lose his/her credentials if he/she lost the mobile device.

Additional features and advantages of the disclosure will be set forth in the descriptions that follow, and in part will be apparent from the descriptions, or may be learned by practice of the disclosure. The objectives and other advantages of the disclosure will be realized and attained by the structure and method particularly pointed out in the written description and claims thereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

FIG. 2 is a process flow diagram illustrating an embodiment of the steps to verify a requested credential of a credential owner.

FIG. 5 is a process flow diagram illustrating an embodiment of the steps to issue a new credential.

DETAILED DESCRIPTION OF THE INVENTION

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

The embodiments introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

The described embodiments concern one or more methods, systems, apparatuses, and computer readable mediums storing processor-executable process steps for verifying a requested credential of a credential owner and/or issuing a new credential through one or more credential service providers.

Each individual has to present a proof of credentials in various situations. For example, an individual has to present his/her driver license and/or other identification documents to open a bank account. An individual has to present his/her driver license and/or employment document to gain access to an office building. An individual has to present his/her driver license or other document with his/her date of birth in order to purchase alcohol at a bar. With advanced blockchain technology, digital credentials can replace the traditional printed credentials. This detailed description discusses the verification and issuance of digital credentials through credential service providers.

Figure 1:
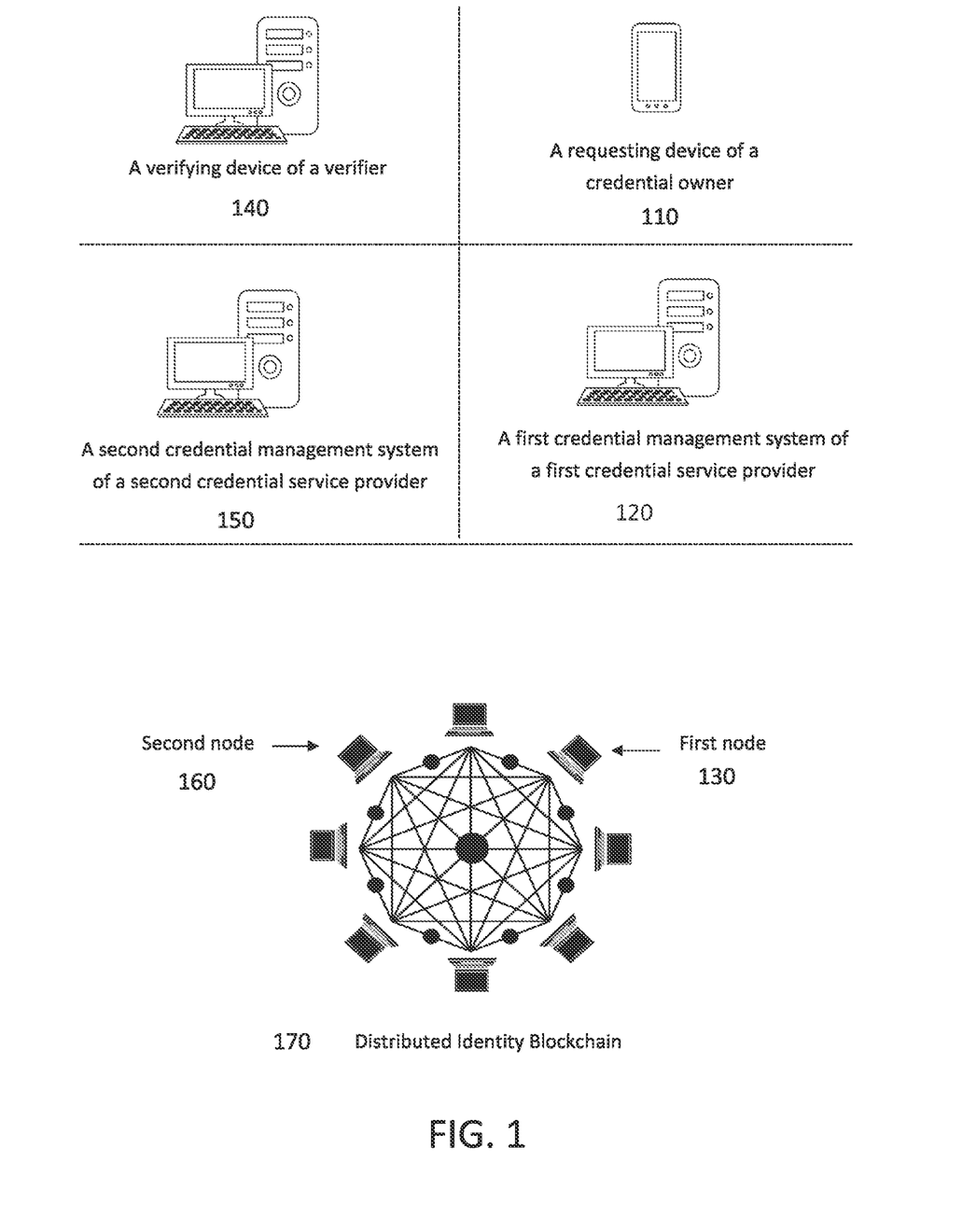
FIG. 1 is a schematic diagram illustrating the relationship between a requesting device of a credential owner, a verifying device of a verifier, a first credential management system of a first credential service provider, a second credential management system of a second credential service provider, a first node and a second node of a distributed identity blockchain.

FIG. 1 illustrates an embodiment where a verifier, e.g. IBM office management, accomplishes proof of requested credentials of a credential owner, e.g. a visitor John Smith, through their corresponding credential service providers, e.g. telecommunication carriers of IBM and the visitor, rather than directly between the verifier and the credential owner. The verifier, IBM office management, asks the credential owner, John Smith, to present his credentials, here both the information on his driver license and employment badge. The credential owner, John Smith, uses a requesting device 110, e.g. his mobile phone or other internet device, to send a request to a first credential management system 120 of a first credential service provider, e.g. SoftBank Corp., a Japanese telecommunication carrier John subscribes. In another embodiment, the credential owner and the verifier subscribe the credential management service from the same credential service provider. In that situation, the first credential management system of the first credential service provider may be the same as the second credential management system of the second credential service provider.

The first credential management system 120 of the first credential service provider generates a QR code and submits it back to the requesting device 110. The QR code comprises the information of sharing credential token and service endpoint of the first credential management system. Such information can be represented and transmitted in other forms and formats. The credential owner John then presents the QR code on the requesting device 110 to the verifier IBM office management which uses a verifying device 140, e.g. a mobile phone or an internet device, to scan the QR code. The verifying device 140 sends the QR code to a second credential service provider, e.g. ATT, a US telecommunication carrier IBM subscribes. A second credential management system 150 of the second credential service provider receives the QR code. The second credential management system 150 identifies the first credential management system 120 to be contacted for the proof of credentials from the information in the QR code. Then the second credential management system 150 of ATT communicates directly with the first credential management system 120 of SoftBank to obtain a proof of the credentials.

To perform the verification, the second credential management system 150 also needs to retrieve credential verification information from a distributed ledger stored in a distributed identify blockchain 170 via a second node 160 of the blockchain 170. In one embodiment, the first node 130 of the blockchain 170 is operated by the first credential service provider, e.g. SoftBank and the second node 160 of the blockchain 170 is operated by the second credential service provider, e.g. ATT. If the verifier IBM office management successfully verifies the requested credentials, it will issue an office access permission (a new credential) to the credential owner, e.g. John Smith. The office access permission can be represented by a separate QR code or even in other forms/formats.

Each of the first credential management system and the second credential management system may be a server with secured database, processors, memories, input/output interfaces, wireless and telecommunication components etc. In addition to telecommunication carriers, each of the first credential service provider and the second credential service provider may be any other types of companies, organizations, and institutions.

A credential owner can be an individual, a legal entity, or an organization, such as companies, partnerships, and governments. An individual can own a wide range of various credentials, such as driver license, passport, graduation certificates, employment records, etc. A legal entity also can own various credentials, such as incorporation certificate, patent certificates, etc. Each credential owner has a DID (decentralized identifier), such as did.sovrin.V4SDRN84Z56d7YV7PBUe6f. Similar to wallet addresses, DIDs are globally unique identifiers that are created by their owner or their credential service providers. DIDs have their associated public keys and communication endpoints—addresses where messages can be delivered for that identity. The credential owners of the DIDs hold the corresponding private keys in their wallets that can be managed by their credential service providers. Similar to each wallet address resolves to a virtual wallet, each DID resolves to a DID document containing a set of data that describes the DID and proves ownership and control of the DID, as well as share the cryptographic keys and resource pointers (endpoints).

Each credential has a number of attributes. For example, a driver license credential may have attributes of driver license number, last name, first name, date of birth, height, weight, gender, photo, signature, expiration date, and issuing state. A credential schema is a machine-readable definition of a set of attribute data types and formats that can be used for the claims on a credential. Each credential has its schema. For example, a schema for creating driver license credentials would include definition of above described attributes. An issuer can use a schema to create its own credential definition containing the schema and the attribute specific public verification keys that are paired with the private signing keys of the issuer. For example, California DMV has its own driver license credential definition stored in the distributed identify blockchain. Thus, a verifier or its credential service provider can retrieve the CA driver license credential definition to verify the origin and integrity of that data provided by a credential owner or his/her credential service provider.

Issuers are usually government agencies, education institutions, and corporations. For example, CA DMV can issue CA driver licenses; Department of State can issue passports to US citizens; Stanford University can issue graduation diploma/certificates to its graduates; IBM can issue employment badges to its employees. After verifying some required credentials, an issuer, e.g. CA DMV, can issue a credential, e.g. CA driver license, to an individual, e.g. John Smith. The issuer, or its credential service provider, sends the individual, or his/her credential service provider, a credential offer. Such credential offer is signed with the credential owner's private key to generate a credential request which is sent back to the issuer. The credential request is then signed with issuer's private key to generate a credential, e.g. driver license, which is sent to the credential owner, who stores the credential in his/her wallet at his/her mobile device or a credential management system of his/her credential service provider.

The distributed identity blockchain 170 comprises a plurality of nodes. In one embodiment, the first node 130 is operated by the first credential service provider and the second node 160 is operated by the second credential service provider. In one embodiment, TBCASOFT Inc. ("TBCA") can be an administrator of the distributed identity blockchain 170. TBCA can admit credential service providers to operate nodes of the blockchain 170 and select some of the nodes to serve as validators for the consensus mechanism. Through their credential service providers, issuers and credential owners can create their DIDs and publish the DIDs, associated public keys, credential schemas, credential definitions, and revocation accumulators in the blockchain 170 by recording related information in blocks of a distributed ledger. For the protection of privacy, the credentials, the biometrics (such as photos and finger prints), the private keys associated to DIDs, verification logs, revocation tails file are not recorded in the blockchain 170. In one embodiment, some or all of them can be stored in credential management systems operated by credential service providers. Due to the size of the biometrics data, they can be separately stored in databases operated by contractors.

It is beneficial that credentials are stored in credential management systems operated by credential service providers, rather than credential owners' mobile devices, so that both the proof generation and verification are performed by credential service providers and the proof is transferred directly between credential service providers. Such an arrangement can facilitate the credential verification process and improve user experiences because the interaction between a credential owner and a verifier can be simplified. For example, instead of two-way communications, a credential owner can simply provide a QR code containing the information of a sharing credential token and a service endpoint to a verifier and all other processes are taken care of by the credential service providers. In addition, as described above, in one embodiment, it is beneficial that the first credential service provider and the second credential service provider are telecommunication carriers (telco). It is beneficial for telecommunication carriers to function as trust anchors because they are highly regulated industries that can provide better privacy security and protection to credential owners. In addition, compared to storing credentials at a credential owner's mobile device, under such an arrangement, a credential owner would not lose his/her credentials if he/she lost the mobile device.

FIG. 2 illustrates an embodiment of process flow of verifying requested credentials. At step 210, the requesting device 110 sends a request to the first credential management system 120 of the first credential service provider. In one embodiment, the request may contain a verification requirement document ("VRD") which comprises a list of required attributes and one or more acceptable credentials from which each attribute can be selected. VRDs are originally generated by verifiers based on the purpose of verifications. However, in order to generate an appropriate proof, the first credential management system can receive the VRD from a few different channels. The first channel is the request contains the VRD because the credential owner receives it from the verifier before or obtains it from a database or look up table maintaining issuers' VRDs. In another embodiment, all issuers' VRDs can be stored in a database and each VRD is assigned an ID. As a result, the request may comprise credential verification identification, which may further comprise a VRD ID provided to the first credential management system which can then retrieve the whole VRD from the database. Alternately, the verifier's VRD or its VRD ID can be provided by the second credential management system to the first credential management system in connection with the proof request sent at step 230.

The requesting device may be a mobile phone or any other portable electronic device that can communicate with the first credential management system and the verifying device. Before providing the sharing credential token and the service endpoint, the first credential management system may authenticate the requesting device of the credential owner based on an ID of the requesting device. In one embodiment, the ID of the requesting device is an International Mobile Equipment Identity.

Figure 3:
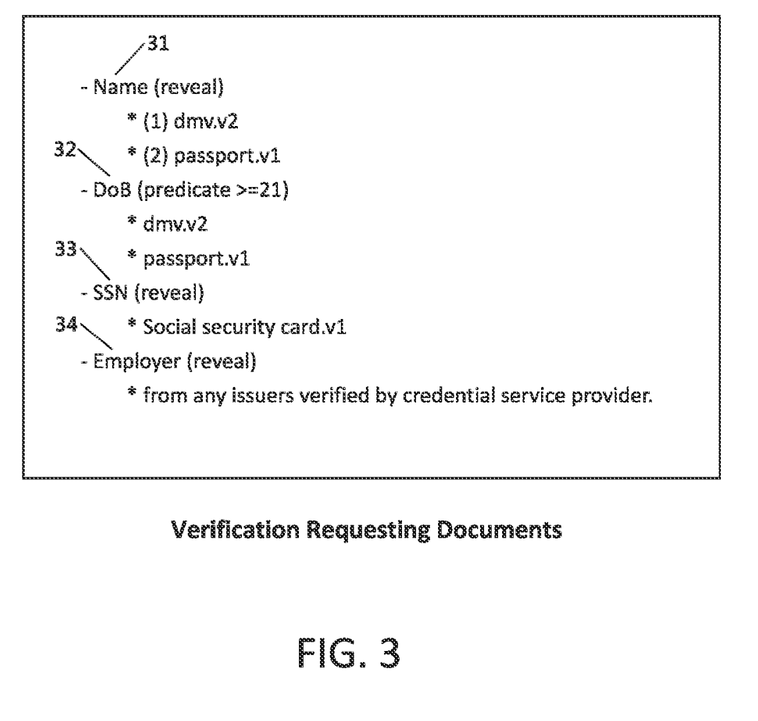
FIG. 3 is a schematic diagram illustrating an embodiment of a verification requirement document.

FIG. 3 illustrates an embodiment of verification requirement document. The verification requirement document shown in FIG. 3 requires four attributes—name 31, date of birth (DoB) 32, social security number (SSN) 33, and employer 34. Each of these attributes 31, 32, 33, 34 has to be selected from one of the predetermined acceptable credentials. For example: content of the "name" attribute 31 has to be selected from either a driver license credential or a passport credential; content of the "date of birth" attribute 32 has to be selected from either a driver license credential or a passport credential; content of the "social security number" attribute 33 has to be selected from a social security card credential; content of the "employer" attribute 34 has to be selected from any issuers verified by credential service providers. Each credential is associated with a version of the credential version, such as v1 and v2. The factual data of some attributes have to be revealed to the verifier. For other attributes, predicate of these attributes is sufficient (zero knowledge proof).

At step 220 illustrated in FIG. 2, the first credential management system 120 generates a sharing credential token and a service endpoint. The sharing credential token comprises a globally unique ID generated based on the timestamp. The service endpoint is a port upon which the second credential management system 150 can connect with the first credential management system 120 to send a proof request. In one embodiment, the service endpoint looks like 8.8.9.9:9090. In one embodiment, the information of both the sharing credential token and the service endpoint is transformed to a QR code. In one embodiment, the QR code containing the sharing credential token and the service endpoint can be generated in advance as a pre-approval of the credential owner for the credential to be verified later. At step 222, both the sharing credential token and the service endpoint (or a QR code containing such information) are sent back to the requesting device 110 of the credential owner. At step 224, both the sharing credential token and the service endpoint can be provided by the requesting device 110 of the credential owner to the verifying device 140 of the verifier via near field communication, Bluetooth, WiFi or other means. Alternatively, the credential owner can present a QR code containing the information of the sharing credential token and the service endpoint) in the requesting device 130 to the verifier for the verifying device 140 to scan the QR code. At step 226, both the sharing credential token and the service endpoint (or a QR code containing such information) are provided to the second credential management system 150 of the second credential service provider.

The second credential management system 150 identifies the port to connect with the first credential management system 120 based on the service endpoint. At step 230, the second credential management system 150 sends the proof request to the first credential management system 120. The proof request may comprise the sharing credential token. In one embodiment, the second credential management system 150 also sends the verifier's VRD or VRD ID to the first credential management system 120.

At step 240, the first credential management system 120 determines whether the sharing credential token is valid. In one embodiment, the sharing credential token is invalid if the lapse of time exceeds a predetermined period. If the sharing credential token is valid, at step 242, the first credential management system 120 then selects one or more attributes respectively from one or more credentials based on the VRD. If the sharing credential token is invalid, the verification fails. At step 244, the first credential management system 120 generates a revealed attribute and/or a predicate attribute with zero knowledge proof algorithm for each selected attribute and then generates the proof comprising each selected attribute.

At step 246, the first credential management system 120 sends the proof to the second credential management system 150. At step 250, the second credential management system 150 requests the second node 160 of the distributed identity blockchain 170 to retrieve credential cryptography information, including the schema, the schema definition, the issuer's public key, the credential owner's public key, from the distributed ledger stored in the distributed identity blockchain 170.

At step 255, the second node 160 provides the above credential cryptography information back to the second credential management system 150. At step 260, the second credential management system 150 verifies the proof based on the above credential cryptography information retrieved from the distributed ledger. The zero knowledge proof algorithm may be used for verifying the proof.

Figure 4:
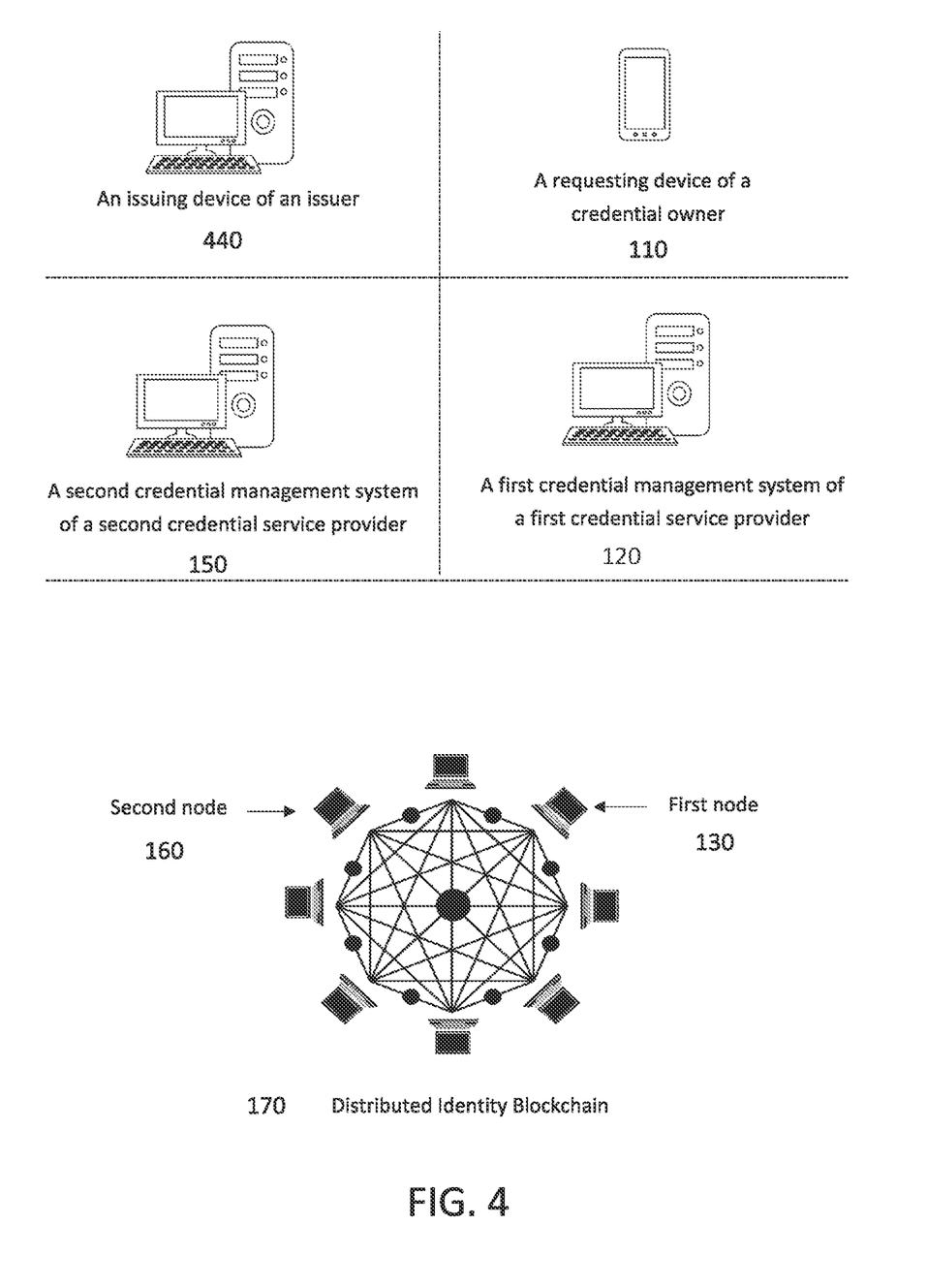
FIG. 4 is a schematic diagram illustrating the relationship between a requesting device of a credential owner, an issuing device of an issuer, a first credential management system of a first credential service provider, a second credential management system of a second credential service provider, a first node and a second node of a distributed identity blockchain.

Similar to FIG. 1, FIG. 4 illustrates an embodiment where an issuer, e.g. IBM office management, issues a new credential, a daily office access permission, to a credential owner, e.g. a visitor John Smith, through the first credential management system 120 of the first credential service provider and the second credential management system 150 of the second credential service provider, e.g. ATT, the telecommunication carrier of IBM, and SoftBank, the telecommunication carrier for the visitor, rather than directly between the issuer and the credential owner. In another embodiment, the credential owner and the issuer may subscribe the credential management service from the same credential service provider. In that situation, the first credential management system of the first credential service provider may be the same as the second credential management system of the second credential service provider.

FIG. 5 illustrates an embodiment of the process flow of issuing a new credential. This embodiment assumes that the second credential management system 150 of the second service provider has the service endpoint of the first credential management system 120 of the first credential service provider. One possibility is that the second credential management system 150 received the service endpoint when it performed the credential verification for the issuer who previously acted as a verifier. In another embodiment, the requesting device 110 of the credential owner may provide such service endpoint to the second credential management system via the verifier. At the beginning, the credential owner requests for a new credential. The issuer notifies the second credential management system if it approves the new credential request. At step 510, the second credential management system generates a credential offer for the issuer, which comprises the data of the required attributes for the new credential, e.g. visitor's name and date for a daily office access permission. At step 520, the second credential management system 150 sends the credential offer to the first credential management system 120. At step 530, the first credential management system 120 signs the credential offer with the credential owner's private key to generate the credential request. At step 540, the first credential management system 120 sends the credential request back to the second credential management system 150. At step 550, the second credential management system 150 signs the credential request with the issuer's private key to generate the new credential. At step 560, the second credential management system 150 sends the new credential to the first credential management system 120. At step 570, the first credential management system 120 stores the new credential for the credential owner and notifies the credential owner. Below is an embodiment of the pseudo code performing the following 8. the second credential management system generates a credential offer and then sends it to the first credential management system.
9. the first credential management system generates a credential request and returns it to the second credential management system.
10. the second credential management system generates a new credential and sends it to the first credential management system.
11. the first credential management system stores the new credential in the credential owner's wallet.

| Requesting device of credential owner | Verifying device of verifier/issuing device of issuer | First credential management system of first credential service provider | Second credential management system of second credential service provider |
|---|---|---|---|
| Qr_code = request_qr( ) | | | |
| | | token, endpoint = generate_qr( ) | |
| | token, endpoint = scan_qr( ) carrier_B.verify( ) | | |
| | | | pr = generate_proof_request( ) carrier_A = create(end_point) carrier_A.send(pr, token) |
| | | p = generate_proof(pr) | |
| | | | b = verify_proof(p) |
| | If(b) carrier_B.issue_credential( ) | | |
| | | | co = create_credential_offer( ) |
| | | cr = create_credential_request(co) | |
| | | | cred = create_credential(cr) carrier_A. send_credential(cred) |
| | | save_credential(cred) | | process steps where a verifier becomes an issuer at a second stage if the verification is successful.
1. a requesting device of a credential owner makes a request for a QR code containing the information of sharing credential token and service endpoint.
2. a first credential management system generates the QR code containing the information of sharing credential token and service endpoint.
3. a verifier's verifying device scans the QR code from the requesting device; the verifying device calls a second credential management system to verify the credentials.
4. the second credential management system generates a proof request based on a VRD listing the attributes of the acceptable credentials of the credential owner that need to be verified; the first credential management system is identified based on the service endpoint provided by the verifying device.
5. the first credential management system generates the proof based on the proof request; the proof is sent to the second credential management system.
6. the second credential management system verifies the proof.
7. if the verification is successful, an issuing device (for example the previous verifying device) of an issuer (previous verifier) fills in the form and sends it to the second credential management system by calling "issue" API.

It will be apparent to those skilled in the art that various modification and variations can be made in the credential verification and issuance method and related apparatus of the present invention without departing from the spirit or scope of the invention. Thus, it is intended that the present invention cover modifications and variations that come within the scope of the appended claims and their equivalents.

What is claimed is:
1. A method for verifying at least one requested credential of a credential owner, comprising:
(a) providing, by a first credential management system of a first credential service provider subscribed by the credential owner, a sharing credential token and a service endpoint to a requesting device of the credential owner, upon a request from the requesting device, wherein the request is associated with one or more attributes selected by a verifier from the at least one requested credential of various types of credentials of the credential owner, and the service endpoint is a port for a second credential management system of a second credential service provider to connect with the first credential management system;
(b) receiving, by the second credential management system of the second credential service provider, from a verifying device of the verifier subscribing to the second credential service provider through the requesting device of the credential owner, the sharing credential token and the service endpoint, wherein the first credential service provider differs from the second credential service provider, the first credential management system differs from the second credential management system;

(c) sending, by the second credential management system of the second credential service provider, a proof request containing the sharing credential token and information indicating the one or more attributes to the first credential management system of the first credential service provider based on the service endpoint;

(d) generating, by the first credential management system of the first credential service provider, a revealed attribute or a predicate attribute with zero knowledge proof algorithm for the one or more attributes selected by the verifier to generate a proof based on the proof request after determining that the sharing credential token is valid; and (e) verifying, by the second credential management system of the second credential service provider, the proof received from the first credential management system of the first credential service provider based on credential cryptography information, including at least one issuer's public key for verifying a signature in the at least one requested credential, retrieved from a distributed ledger.

2. The method of claim 1, wherein step (a) further comprises authenticating, by the first credential service provider, the requesting device of the credential owner based on an identification (ID) of the requesting device.

3. The method of claim 2, wherein the requesting device is a mobile phone and the ID is an International Mobile Equipment Identity.

4. The method of claim 1, wherein the request comprises a verification requirement document originally from the verifier.

5. The method of claim 4, wherein the verification requirement document comprises the one or more attributes and the at least one requested credentials where each of the one or more attributes is selected from.

6. The method of claim 1, wherein the request comprises a credential request identification and the first credential management system obtains, from a database or the distributed ledger, the one or more attributes and the requested at least one credentials where each of one or more the attributes is selected from, based on the credential request identification.

7. The method of claim 6, wherein the credential request identification comprises a verification requirement document ID.

8. The method of claim 1, wherein step (c) comprises sending, by the second credential management system of the second credential service provider, the proof request and a verification requirement document ID to the first credential management system of the first credential service provider based on the service endpoint.

9. The method of claim 1, wherein the sharing credential token comprises a globally unique ID generated based on a timestamp.

10. The method of claim 1, wherein the first credential management system provides the sharing credential token and the service endpoint in a format of a quick response (QR) code.

11. The method of claim 1, wherein step (d) comprises:
(d1) authenticating the sharing credential token;
(d2) selecting the one or more attributes respectively from the at least one requested credential based on a verification requirement document;
(d3) generate a revealed attribute or a predicate attribute with zero knowledge proof algorithm for each selected attribute to generate the proof by the first credential management system of the first credential service provider.

12. The method of claim 1, wherein the proof comprises either the factual data of each of one or more attributes or the predicate of the attribute based on a verification requirement document.

13. The method of claim 1, wherein the credential cryptography information comprises a credential schema, a credential definition, a public key of the credential owner, and an issuer's public key.

14. The method of claim 1, wherein the first credential service provider and the second credential service provider are telecommunication carriers.

15. The method of claim 1, further comprising:
(f) receiving, by the first credential management system from the second credential management system, a credential offer;
(g) generating, by the first credential management system, a credential request based on the credential offer; and
(h) generating, by the second credential management system, a new credential based on the credential request received from the first credential management system.

16. The method of claim 15, further comprising:
(i) receiving and storing, by the first credential management system or the requesting device, the new credential.

17. The method of claim 15, wherein at step (g), the credential request is generated by signing the credential offer with a private key of the credential owner.

18. The method of claim 15, wherein at step (h), the new credential is generated by signing the credential request with an issuer's private key.

* * * * *